Patented Dec. 5, 1933

1,937,533

UNITED STATES PATENT OFFICE 1,937,533

SYNTHETIC RESIN AND METHOD OF PRODUCING SAME

Israel Rosenblum, Jackson Heights, N. Y.

No Drawing. Application December 3, 1929
Serial No. 411,388

20 Claims. (Cl. 260—8)

My invention relates to synthetic resins and has for one of its objects to produce waterproof resins of plastic nature which are compatible with oil varnishes and also with cellulosic, and particularly with cellulose nitrate (or so-called "nitrocellulose"), lacquers, and are capable of forming with such varnishes and lacquers a clear, elastic, strongly adherent and waterproof film.

It is also an object of my invention to produce synthetic gums of a very soluble character which are soluble especially in oil varnishes and also in the common solvents used in the manufacture of cellulose nitrate lacquers.

Briefly stated, my invention comprises producing mixed polyhydric alcohol esters of a natural resin acid and a high molecular weight fatty acid in such manner that each ester molecule, as far as possible, contains at least one residue of each acid. In this way, I obtain complex resins or ester gums which are tough and plastic in character and may be dissolved in varnish solvents, and are soluble also in the common cellulose derivative lacquer solvents and are compatible with such lacquers and improve the properties thereof.

In my co-pending application, Serial No. 336,632, filed January 31, 1929, now Patent No. 1,809,570, I have described a method of producing a complex ester of a polyhydric alcohol, such as glycerol, with a phenol-formaldehyde condensate and a natural resin acid. As described in said application, glycerol may be treated in excess with a "cracked" or dry distilled natural resin, such as wood rosin, which has been heated to about 260° C. or above, and comparatively large quantities of glycerol mono and di-resinate or abietate obtained. These partial glycerol esters are then caused to react with a phenol-aldehyde condensate, and particularly with a phenol-aldehyde-organic metal salt condensate, to produce a phenol-aldehyde-organic metal salt-polyhydric alcohol-resin acid ester complex.

I have now found that if the partial glyceridic esters of the resin acids are caused to react with free fatty acids of high molecular weight in such manner that the fatty acids neutralize the free hydroxyl groups in the glycerol (or other polyhydric alcohol) mono and di-resinates, valuable complex bodies may be obtained which may be represented by the following formulas:

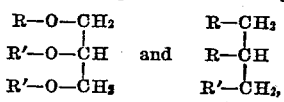

where R and R' represent the resin acid and fatty acid residues, respectively. The reaction takes place in the presence of the completely esterified alcohol resinate (e. g. glycerol tri-resinate or abietate) which is practically always present with the partial polyhydric alcohol- resin esters. This completely neutralized polyhydric alcohol-resin gum, which we shall for convenience specifically refer to as glycerol tri-abietate,, (though, as stated other polyhydric alcohols and other natural resins may be employed) acts as a solvent for the partial esters and for the fatty acids and exerts a favorable influence, in the manner of a catalyst, upon the course of the reaction between the partial esters and such fatty acids.

As indicated above, I prefer to use the fatty acids of high molecular weight, such as linoleic, linolenic, myristic, oleic, ricinoleic, stearic, palmitic, fatty acids derived from China wood oil, and, in general, fatty acids obtained upon the hydrolysis of drying, non-drying, edible and non-edible oils and fats.

The products obtained by the reaction between glycerol mono and di-abietate in the presence of the tri-abietate with a fatty acid, or mixture of fatty acids of high molecular weight are plastic gums of high molecular weight which may be dissolved in varnish oils to produce an excellent waterproof varnish and may be mixed with cellulose ester lacquers to produce transparent, tough, durable, elastic, waterproof and strongly adherent films.

Instead of reacting the glycerol (or other polyhydric alcohol) first with the cracked resin, I may first treat an excess of glycerol, based on molecular proportions, with one or more fatty acids in order to produce the partially esterified alcohol, the reaction being so conducted as to avoid as much as possible the formation of the tri-glyceride, that is, the completely esterified alcohol. These partial esters are then caused to react with a natural resin, such as wood or stump rosin, copal, etc., preferably in substantially the theoretical proportions required to neutralize the partial esters completely, so as to produce a plastic gum composed essentially of one or more mixed or complex esters of glycerol with fatty and resin acids and containing a minimum of glycerol tri-ester of fatty acid or of resin acid. It will be understood that where I employ the polyhydric alcohols, such as glycol, mannitol, etc., I so conduct the reactions as to avoid as much as possible the complete esterification of the alcohol, or any portion thereof, with only a single acid, as it is my intention to form mixed or complex esters wherein different acid radicles are present in the same ester molecule, and not merely a mixture of alcohol esters wherein all of the neutralized hydroxyl groups of each alcohol molecule are substituted by the same acid residue.

While I prefer to use a cracked resin in the reactions described above, and particularly when the alcohol is caused to react first on the resin acids, ordinary resin, such as wood or stump rosin, may be used without preliminary treatment, though the product obtained with uncracked rosin is not, in general, as satisfactory as that produced with the cracked material but is adequate for many purposes.

The reactions may, if desired, be carried out in the presence of catalysts, such as metallic oxides, for example zinc oxide, or organic salts, such as zinc abietate, or any of the other metal compounds named in my above mentioned Patent No. 1,809,570.

In order that my invention may be better understood, I shall describe several ways of carrying out the same, but it will be understood that these examples are illustrative only and that my invention is not limited thereto.

Example 1

650 pounds of cracked or dry-distilled wood rosin are heated with 15% of glycerol, based on the weight of rosin, up to about 220° to 230° C. until the acidity of the mixture has been reduced to a low value by the formation of glycerol diabietate. There are then added 75 pounds of linoleic acid to the partial glycerol ester and the mixture heated to about 240° C. or above, either vacuum or pressure being applied until the product is of low acid value and soluble in toluol to a clear solution. There is obtained in this way a plastic resin which is compatible with oil varnishes as well as with cellulose ester lacquers, imparting thereto elasticity, gloss and durability.

In place of the cracked rosin, I may employ uncracked rosin, but the results with the latter material are not usually as satisfactory as with the cracked rosin because of the smaller quantity of glycerol mono and di-abietate obtainable with the uncracked rosin and because of the presence of compounds which appear to be of ketonic or lactonic character and are of crystalline nature and insoluble in acetic acid ester solvents, as explained in my co-pending application, Serial No. 371,066, filed June 14, 1929 now Patent 1,808,716.

Example 2

280 pounds of stearic or linoleic aicd, or the acids obtained upon hydrolysis of linseed oil, are heated in the presence of 100 pounds of glycerol to a temperature of about 240° to 250° C. or above until the glycerol mono-steerate or monolinoleate is formed. 604 pounds of abietic acid, or its equivalent weight of colophony, are then added and the temperature kept at about 240-250° C., vacuum being preferably applied, until the product dissolves to a clear solution in toluol, and is of low acid value, the reaction usually requiring from 12 to 15 hours. I thus obtain a completely neutralized glycerol ester in which two hydroxyls are replaced by two abietic acid residues.

Example 3

The same procedure is carried out as set forth under Example 2, except that dry-distilled fossil resin is used in place of the abietic acid or colophony. A similar product is obtained which is plastic and is compatible with oil varnishes and with cellulose nitrate and other cellulosic lacquers.

Example 4

298 pounds of ricinoleic acid is heated with 100 pounds of glycerol to a temperature of about 240-250° C. until the acid number is about 1. There are then added 620 pounds of rosin and the heating continued under vacuum until a sample of the resin forms a clear solution in toluol. This product is excellently suited for admixture with cellulose nitrate lacquers and imparts flexibility, durability and waterproofness thereto.

Example 5

The procedure outlined in Example 4 may be followed except that instead of rosin a fossil resin may be used.

In each of the examples given above, glycerol has been specified because of the low cost of the same, but it will be understood that other polyhydric alcohols may be used, the proportions of the raw materials being so selected as to produce first a partial ester of the alcohol with one acid, the remaining hydroxyls being then neutralized with one or more other aicds.

Variations from the specific ingredients and proportions stated herein may be resorted to within the scope of the appended claims without departing from the spirit of the invention.

What is claimed is:

1. The method of producing a permanently fusible and oil-soluble synthetic resin, which consists in reacting a polyhydric alcohol with a natural resin and with a fatty acid in either order, said acid obtainable on hydrolysis of an oil or fat.

2. The method of producing a synthetic resin, which comprises reacting a polyhydric alcohol with a cracked natural resin and with a fatty acid in either order, said acid obtainable on hydrolysis of an oil or fat.

3. The method of producing a permanently fusible and oil-soluble synthetic resin, which consists in reacting glycerol with a natural resin and with a fatty acid in either order, said acid obtainable on hydrolysis of an oil or fat.

4. The method of producing a synthetic resin, which comprises reacting glycerol with a cracked natural resin and with a fatty acid in either order, said acid obtainable on hydrolysis of an oil or fat.

5. The method of producing a permanently fusible and oil-soluble synthetic resin, which consists in reacting a polyhydric alcohol with rosin and with a fatty acid in either order, said acid obtainable on hydrolysis of an oil or fat.

6. The method of producing a synthetic resin, which comprises reacting a polyhydric alcohol with cracked rosin and with a fatty acid in either order, said acid obtainable on hydrolysis of an oil or fat.

7. The method of producing a permanently fusible and oil-soluble synthetic resin, which consists in reacting a polyhydric alcohol with wood rosin and with a fatty acid in either order, said acid obtainable on hydrolysis of an oil or fat.

8. The method of producing a synthetic resin, which comprises reacting a polyhydric alcohol with cracked wood rosin and with a fatty acid in either order, said acid obtainable on hydrolysis of an oil or fat.

9. The method of producing a permanently fusible and oil-soluble synthetic resin, which consists in reacting a polyhydric alcohol with rosin and with the acids obtained upon hydrolysis of linseed oil in either order.

10. The method of producing a synthetic resin, which comprises reacting a polyhydric alcohol with cracked rosin and with the acids obtained upon hydrolysis of linseed oil in either order.

11. The method of producing a permanently fusible and oil-soluble synthetic resin, which consists in reacting a polyhydric alcohol with rosin and with the acids obtained upon hydrolysis of a drying oil.

12. The method of producing a synthetic resin, which comprises reacting glycerol with cracked rosin and with the acids obtained upon hydrolysis of linseed oil.

13. A permanently fusible and oil-soluble mixed polyhydric alcohol ester whose acid radicals consist of those of a resin acid and one or more fatty acids obtainable on hydrolysis of an oil or fat.

14. A permanently fusible and oil-soluble mixed glyceride of a resin acid and one or more fatty acids obtainable on hydrolysis of an oil or fat.

15. A permanently fusible and oil-soluble mixed glyceride of abietic acid and at least one of the fatty acids obtained upon hydrolysis of a drying oil.

16. The method which consists in partially esterifying a polyhydric alcohol with one or more acids obtainable on hydrolysis of an oil or fat, and neutralizing the product with a natural resin acid.

17. The method which consists in partially esterifying glycerol with one or more of the acids obtainable on hydrolysis of linseed oil, and neutralizing the product with abietic acid.

18. The method which comprises reacting a polyhydric alcohol with a natural resin and with a fatty acid in either order in the presence of an organic salt of zinc, said acid obtainable on hydrolysis of an oil or fat.

19. The method which comprises reacting a polyhydric alcohol with a natural resin and with a fatty acid in either order in the presence of an organic salt of zinc, said acid obtainable on hydrolysis of an oil or fat.

20. A resinous material containing a mixed polyhydric alcohol ester of a resin acid and one or more fatty acids having fourteen or more carbon atoms.

ISRAEL ROSENBLUM.